US010741043B2

(12) United States Patent
Hughes et al.

(10) Patent No.: US 10,741,043 B2
(45) Date of Patent: Aug. 11, 2020

(54) OFFENDER MONITORING SYSTEM

(71) Applicant: G4S MONITORING TECHNOLOGIES LIMITED, Leicester, Leicestershire (GB)

(72) Inventors: Aled Hughes, Leicester (GB); Jon Gordon, Leicester (GB)

(73) Assignee: G4S MONITORING TECHNOLOGIES LIMITED, Leicester (GB)

(*) Notice: Subject to any disclaimer, the term of this patent is extended or adjusted under 35 U.S.C. 154(b) by 0 days.

(21) Appl. No.: 16/312,690

(22) PCT Filed: Jun. 22, 2017

(86) PCT No.: PCT/GB2017/051828
§ 371 (c)(1),
(2) Date: Dec. 21, 2018

(87) PCT Pub. No.: WO2017/221016
PCT Pub. Date: Dec. 28, 2017

(65) Prior Publication Data
US 2019/0213861 A1 Jul. 11, 2019

(30) Foreign Application Priority Data
Jun. 24, 2016 (GB) .................................. 1611038.9

(51) Int. Cl.
*G08B 23/00* (2006.01)
*G08B 21/02* (2006.01)
(Continued)

(52) U.S. Cl.
CPC ........... *G08B 21/0275* (2013.01); *G07C 9/28* (2020.01); *G08B 21/025* (2013.01);
(Continued)

(58) Field of Classification Search
CPC .. G08B 21/0275; G08B 29/185; G08B 21/22; G08B 21/0286; G08B 21/0222;
(Continued)

(56) References Cited

U.S. PATENT DOCUMENTS 6,844,816 B1 * 1/2005 Melton ............... G07C 9/00111
340/5.27
10,033,457 B2 * 7/2018 Sanchez-Valenzuela ....................
G08B 21/22
(Continued)

FOREIGN PATENT DOCUMENTS

| EP | 0344138 A2 | 11/1989 |
|----|------------|---------|
| WO | 01/26067 A1 | 4/2001 |
| WO | 2007/031843 A1 | 3/2007 |

OTHER PUBLICATIONS

Great Britain Search Report dated Aug. 24, 2016 for Application No. GB1611038.9.

*Primary Examiner* — Anh V La
(74) *Attorney, Agent, or Firm* — Patterson + Sheridan, LLP

(57) ABSTRACT

An offender monitoring system has an electronic tag and a monitoring unit. The electronic tag has a tether to secure the electronic tag to an offender and a communication device to communicate with the monitoring unit. The monitoring unit has a communication device to communicate with the electronic tag. The system has a processor which analyses a communication between the electronic tag and the monitoring unit to determine a communication property, such as latency, variability of latency over a plurality of communications and signal strength. The processor determines, based on the measured communication property differing from a historical value, whether the communication between the
(Continued)

electronic tag and the monitoring unit has been relayed via an intermediary device in an attempt by the offender to trick the monitoring unit.

20 Claims, 7 Drawing Sheets

(51) Int. Cl.
*H04L 1/20* (2006.01)
*G08B 29/18* (2006.01)
*G08B 21/22* (2006.01)
*G07C 9/28* (2020.01)

(52) U.S. Cl.
CPC ..... *G08B 21/0222* (2013.01); *G08B 21/0286* (2013.01); *G08B 21/22* (2013.01); *G08B 29/185* (2013.01); *H04L 1/20* (2013.01)

(58) Field of Classification Search
CPC .... G08B 21/025; G08B 29/02; G08B 29/046; G08B 21/0269; H04L 1/20; G07C 9/00111; G07C 9/28; H04W 4/025; H04B 17/101
USPC ............... 340/573.4, 539.13, 573.1, 539.11; 455/404.2, 456.1, 456.5, 456.6, 456.45
See application file for complete search history.

(56) References Cited

U.S. PATENT DOCUMENTS

| 2005/0040944 | A1* | 2/2005 | Contestabile | G08B 21/0269 340/539.13 |
| 2005/0285739 | A1* | 12/2005 | Velhal | G08B 21/0227 340/572.1 |
| 2008/0088437 | A1* | 4/2008 | Aninye | G07C 9/00111 340/539.13 |

* cited by examiner

OFFENDER MONITORING SYSTEM

FIELD OF THE INVENTION

The present invention relates to an offender monitoring system.

BACKGROUND OF THE INVENTION

An offender may be fitted with an electronic tag in order to enforce conditions prescribed to the offender as a punishment for an offence, as a condition of their release on bail or as a condition of their early release from prison. One of the conditions that can be enforced by an electronic tag is a curfew, which prevents the offender leaving their home at certain times, especially at night.

Electronic tags typically emit a radio-frequency communication which identifies the wearer of the tag. A monitoring unit is located in the offender's home. The radio-frequency communication from the electronic tag is received by the monitoring unit whenever the electronic tag is in the vicinity of the monitoring unit. If the monitoring unit does not receive the radio-frequency communication, this indicates that the offender has moved out of range of the monitoring unit, for example, by leaving their home.

When the offender is under a curfew, the offender should not leave their home between certain times, such as overnight. During the curfew, the monitoring unit checks that the radio-frequency communications are being received from the electronic tag indicating that the offender is still in the vicinity of the monitoring unit, which is taken to mean that the offender is still at home respecting their curfew.

If, when the offender is under curfew, the monitoring unit does not receive, or stops receiving, the radio-frequency communication from the electronic tag or if the signal strength of the radio-frequency communication drops below a signal strength threshold, this indicates that the offender is no longer in the vicinity of the monitoring unit which means that the offender has probably left their home and is breaking their curfew. The monitoring unit sends an alarm communication to a monitoring centre alerting the monitoring centre to the possibility that the offender has broken their curfew.

Offenders usually have a strong desire to break their curfew without detection. It would, therefore, be desirable to find a way to detect whether an offender is breaking, or at least attempting to break, their curfew.

SUMMARY OF THE INVENTION

According to a first aspect of the invention, there is provided an offender monitoring system comprising an electronic tag and a monitoring unit. The electronic tag comprises a tether and a communication device. The tether is configured to secure the electronic tag to an offender. The communication device is configured to communicate with the monitoring unit. The monitoring unit comprises a communication device configured to communicate with the electronic tag. The system further comprises a processor configured to analyse a communication between the electronic tag and the monitoring unit to determine a communication property and determine, based on the communication property, whether the communication between the electronic tag and the monitoring unit has been relayed via an intermediary device.

An offender may have a monitoring unit located at their home which determines whether the offender is obeying a prescribed condition (such as a condition prescribed as a punishment for an offence, as a condition of their release on bail or as a condition of their early release from prison). The prescribed condition may be, for example, a curfew which requires the offender to stay in their home at night. The offender may attempt to break their curfew by relaying communications between their electronic tag and their monitoring unit via an intermediary device in an attempt to fool the monitoring unit into thinking that the offender is still at home and obeying their curfew when the offender has actually left home and is breaking their curfew. For example, the offender may capture communications from the electronic tag with an intermediary device (such as a mobile phone or portable computer), relay those communications across a communications network (such as a mobile phone network or the internet) and retransmit those communications to the monitoring unit. In this way, the offender may attempt to fool the monitoring unit into thinking that the offender is still at home, preventing the monitoring unit from raising an alarm while the offender is breaking their curfew so that the offender can avoid detection of the fact they are breaking their curfew. The fact that the system can use the communication property to determine whether the communication between the electronic tag and the monitoring unit has been relayed via an intermediary device allows the system to determine whether the offender is actually obeying their curfew or whether the offender is only pretending to obey their curfew by attempting to fool the monitoring unit into thinking that the offender is in the vicinity of the monitoring unit.

Relaying communications between the electronic tag and the monitoring unit may lead to a distinctive communication property, or a modified communication property, so the processor can use the communication property to ascertain whether the communication has been relayed.

Determining whether the communication has been relayed may comprise comparing the communication property with a historical communication property. Determining whether the communication has been relayed may comprise determined whether the communication property differs from the historical communication property by more than a threshold amount. When the communication has been relayed, the communication property may differ from a historical communication property as a result of the communication being relayed via the intermediary device, for example, as a result of latency introduced by relaying the communication via the intermediary device, or relaying the communication across the internet.

The communication property may comprise a latency associated with the communication. The communication property may comprise either a one-way or a round trip latency associated with the communication. The latency may indicate that the communication has been relayed. For example, relaying the communication across the internet may lead to the latency being greater than if the communication were taking place directly between the electronic tag and the monitoring unit. A latency which exceeds a latency threshold, or a latency which exceeds a historical latency by more than a threshold amount, may indicate that the communication has been relayed.

The communication property may comprise a time period between the communication being sent and the communication being received. The communication property may comprise a time period between the communication being sent and a response to the communication being received. The time period may indicate that the communication has been relayed. For example, relaying the communication across the internet may lead to the time period being greater than if the communication were taking place directly between the electronic tag and the monitoring unit. For example, a time period which exceeds a time period threshold, or a time period which exceeds a historical time period by more than a threshold amount, may indicate that the communication has been relayed.

The electronic tag may send an identification communication which identifies an offender to whom the electronic tag is secured.

The communication property may be a time period between the electronic tag sending the identification communication and the monitoring unit receiving the identification communication.

The identification communication may comprise a timestamp and the monitoring unit may determine the time period using the timestamp. The time period may be determined by comparing the timestamp of the identification communication against the time the monitoring unit received the identification communication. This may allow the time period to be determined solely based on the identification communication, avoiding the need for any further communication between the monitoring unit and the electronic tag.

The monitoring unit may send a notification communication in response to receiving the identification communication.

The communication property may comprise a time period between the identification communication being sent by the electronic tag and the notification being received by the electronic tag.

The monitoring unit may send a request communication and the electronic tag may send a reply in response to the request communication. The communication property may be a time period between the request being sent by the monitoring unit and the reply being received by the monitoring unit. Calculating the time period based on the request and response communications which are separate from the identification communication, may allow the identification communication to be sent at a different frequency to the request and response communication. This helps to reduce the power consumption of the electronic tag by reducing the number of request communications to which the electronic tag must issue response communications. For example, the identification communication (which is used to monitor whether the offender remains in the vicinity of the monitoring unit) may be sent more frequently that the request and response communications which are used to determine whether the communications are being relayed. For example, the request communication may only be sent when the monitoring unit suspects that the identification communication has been relayed.

The monitoring unit may send a notification communication before the request communication. The notification communication indicates to the electronic tag that the monitoring unit intends to issue a request communication and the electronic tag should keep its receiver turned on. The notification communication may prevent the electronic tag from powering down a receiver in the electronic tag for either: a period of time or until the request communication is received. The notification communications helps the electronic tag to save power, because the electronic tag can turn off the transmitter and/or receiver after sending the identification communication unless the electronic tag receives a notification communication indicating that the monitoring unit intends to issue a request communication.

The notification communication may be configured to switch the communications device in the electronic tag from a frequency associated with the identification and notification communications to a frequency associated with the request and response communications. Providing a notification communication which causes the electronic tag to switch frequencies is advantageous because it allows the frequency of the identification communication and the frequency of the request and reply communications to be individually optimised for their respective requirements. The identification communication may require a frequency providing wide range coverage, for example, to cover the whole house in which the offender is living. A frequency providing wide range coverage may have licensing restrictions which restrict packet length, and such restrictions may not be a significant problem to the identification communication. However, the restrictions on packet length may be a problem for the request and reply communications whereas short range coverage may be acceptable, so a frequency of the request and reply communications may be selected that is not subject to licensing restrictions on packet length but which offers shorter range coverage.

The electronic tag may send an identification communication which identifies an offender to whom the electronic tag is secured and the monitoring unit may send the notification communication in response to receiving the identification communication.

A plurality of communications may be sent and the communication property may be determined for one or more selected communications of the plurality of communications.

The processor may be configured to analyse a plurality of communications between the electronic tag and the monitoring unit and the communication property may comprise a variability of the latency associated with the plurality of communications. Communications that are relayed tend to have a greater variability in latency than communications directly between the electronic tag and the monitoring unit, especially when the communications are relayed over the internet.

The processor may be configured to analyse a plurality of communications between the electronic tag and the monitoring unit and the communication property may comprise a signal strength profile associated with the plurality of communications. The signal strength profile may indicate that the communications are being relayed.

The plurality of communications may have been relayed when the signal strength does not generally increase after a first communication is received and/or does not generally decrease prior to a final communication being received.

The processor may be configured to send an alarm communication to a monitoring centre over a communication link when it is determined that the communication is being relayed.

The intermediary device may comprise a first device configured to receive the communication and transmit the communication over a communication link to a second device configured to transmit the communication. The first and second devices may be one or more of: a portable electronic device, a smartphone, a mobile phone, a computer, a portable computer, and a laptop computer.

BRIEF DESCRIPTION OF THE DRAWINGS

The invention shall now be described, by way of example only, with reference to the accompanying drawings in which.

DETAILED DESCRIPTION

Figure 1:
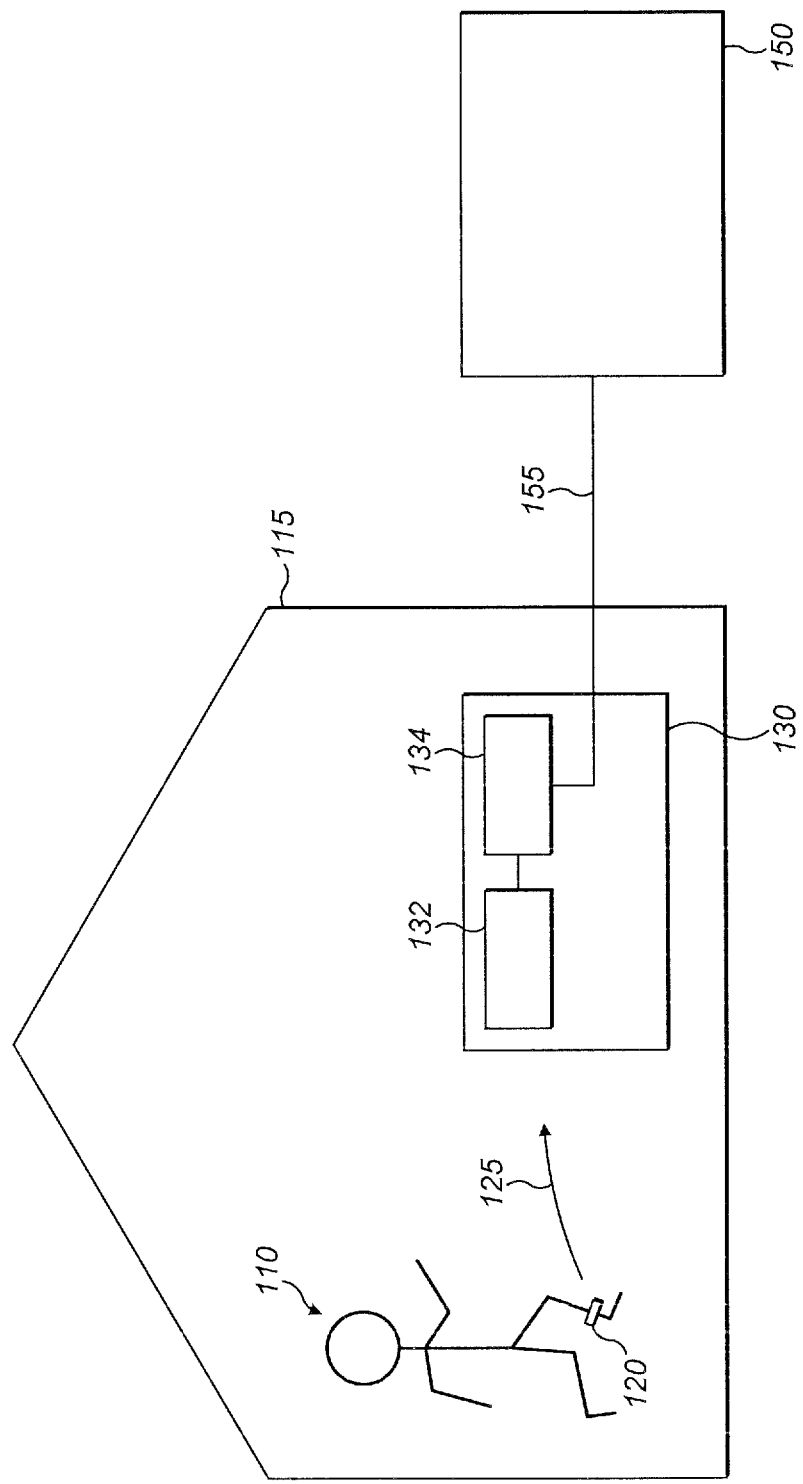
FIG. 1 illustrates a system for monitoring an offender fitted with an electronic tag.

FIG. 1 illustrates a system for monitoring an offender 110 who has been fitted with an electronic tag 120. The electronic tag 120 has been fitted to determine whether the offender 110 is complying with conditions prescribed to the offender 110 as punishment for an offence, as a condition of their release on bail or as a condition of their early release from prison. In this example, the offender 110 has been released from prison early and is subject to a curfew which means that the offender 110 must remain at home 115 overnight.

The system includes the electronic tag 120, a monitoring unit 130, and a monitoring station 150. The monitoring unit 130 is connected to the monitoring station 150 over communication link 155, so that the monitoring unit 130 can alert the monitoring station 150 to the offender 110 breaking their curfew.

The electronic tag 120 is secured to the offender 110 (typically to their ankle) in a way which prevents the offender 110 from removing the electronic tag 120, or at least in a way where removal, or attempted removal, can be identified or reported to the monitoring station 150.

The electronic tag 120 contains a communication device which allows the electronic tag 120 to send communications to the monitoring unit 130. The communication device in the electronic tag 120 sends an identification communication 125 to the monitoring unit. The identification communication 125 contains a code which identifies the offender 110.

The monitoring unit 130 has a communications device 132 which allows the monitoring unit 130 to receive communications from the electronic tag 120. The communications device 132 in the monitoring unit 130 receives the identification communication 125 from the monitoring unit 130 and a processor 134 in the monitoring unit 130 analyses the identification communications 125 to extract the code to identify the offender 110. The processor 134 confirms that the code belongs to the offender 110.

Figure 2:
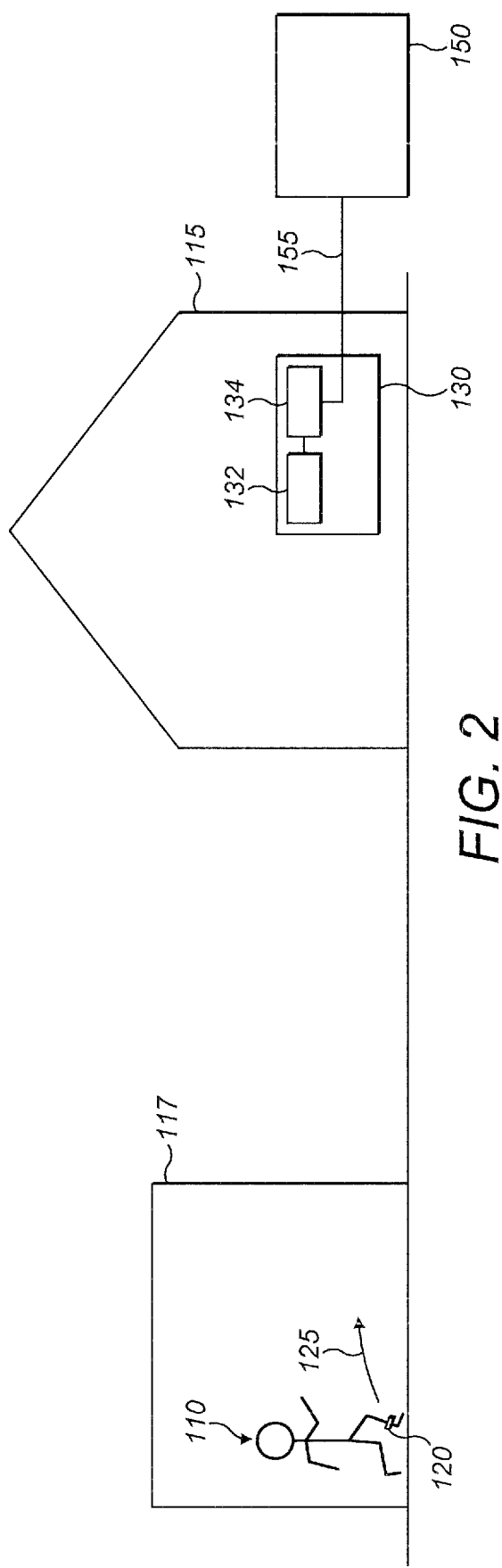
FIG. 2 illustrates raising an alarm when the offender leaves home during their curfew.

FIG. 2 shows the offender 110 having left their home 115, for example, to go to a shop 117. The communication device of the electronic tag 120 continues to send the identification communication 125 containing the code at regular intervals. However, the electronic tag 120 is now out of range of the monitoring unit 130, so the communications device 130 in the monitoring unit 132 is unable to detect the identification communication 125. When the communications device 132 does not receive an identification communication 125 for a period of time, the processor 134 checks the time. If the time indicates that the offender 110 is under a curfew at this time, the processor 134 sends an alarm signal over communication link 155 to monitoring centre 150 indicating that the offender 110 is breaking their curfew.

Instead of the monitoring unit 130 raising an alarm when the monitoring unit 130 is unable to detect the identification communication 125, the monitoring unit 130 may instead raise an alarm when a signal strength of the identification communication 125 drops below a threshold. The threshold may be set so that the signal strength drops below the threshold when the offender 110 is more than an acceptable distance from the monitoring unit 130 which indicates that the offender 110 has left their home 115.

Figure 3:
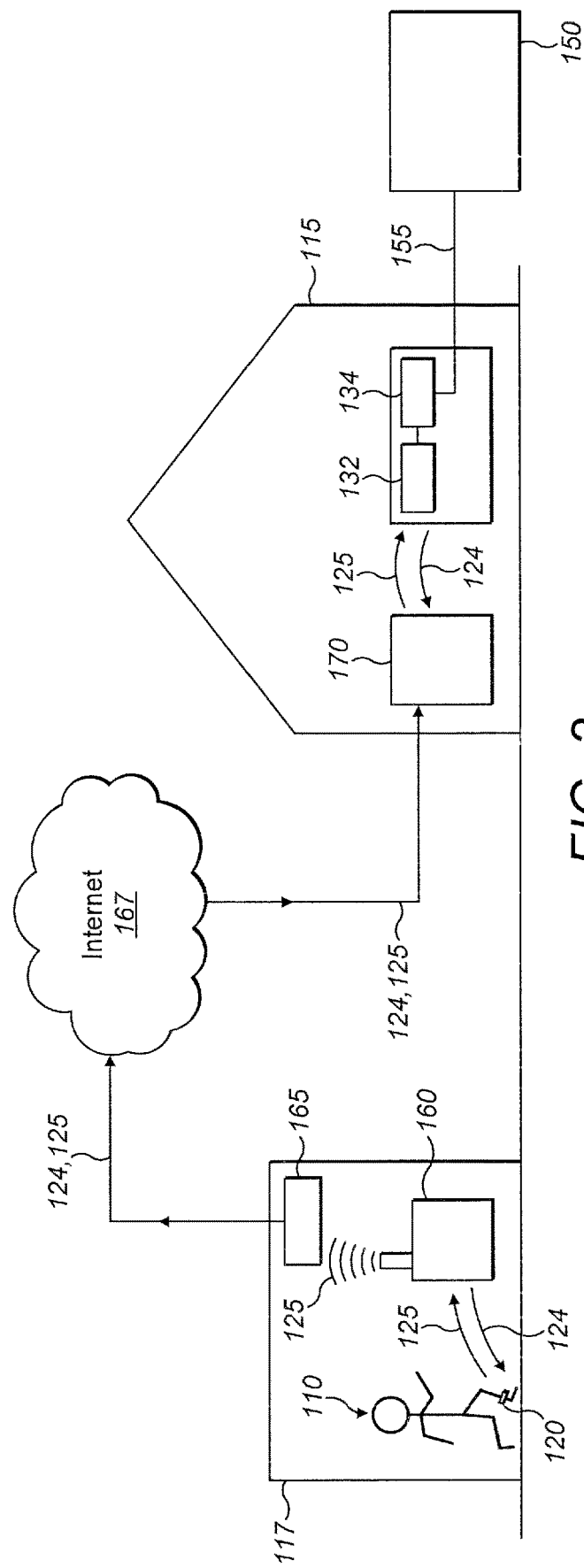
FIG. 3 illustrates how communications between the electronic tag and a monitoring unit may be relayed over the internet.

FIG. 3 illustrates a technique by which an identification communication 125 from an electronic tag 120 may be relayed over a communication network, such as the internet 167. Using this technique, the offender 110 could pretend to be in their home 115 when they are actually somewhere else, such as the shop 117. This technique allows the offender 110 to fool the monitoring unit 130 into thinking that the offender 110 is still at home 115, preventing the monitoring unit 130 from raising an alarm while the offender 110 is breaking their curfew so that the offender 110 can avoid detection of the fact they are breaking their curfew.

The offender 110 carries a portable device 160 which receives the identification communication 125 from the electronic tag 110 and relays the identification communication 125 over the internet 167 to a fixed device 170 located in the home 115 of the offender 110. The fixed device 170 transmits the identification communications 125 to the monitoring unit 130.

To achieve bi-directional communication, the second device 170 may also receive a communication (such as request 124) from the communications device 132 on the monitoring unit 130 and relays the request 124, over the internet 167, to the portable device 160 which transmits the request 124 to the electronic tag 110.

As the monitoring unit 130 and electronic tag 110 are able to communicate, the monitoring unit 130 thinks that the offender 110 is in their home 115 and does not raise an alarm with the monitoring centre 150. In this way, the offender 110 can fool the monitoring unit 130 into believing that the offender 110 is obeying their curfew.

However, relaying communications between the electronic tag 110 and the monitoring unit 130 across the internet 167, or another network, can modify one or more properties of the communications. By examining the communications between the electronic tag 110 and the monitoring unit 130 for signs of one or more of these modified properties, it is possible to determine whether the communications have been relayed.

For example, relaying the identification communication 125 across the internet can significantly increase the latency associated with the identification communication 125. The time period between the identification communication 125 being transmitted by the electronic tag 110 and the monitoring unit 130 receiving the identification communication 125 directly from the electronic tag 110 when the electronic tag 110 is in the vicinity of the monitoring unit 130 may be around 1-2 ms. In contrast, the time period between the identification communication 125 being transmitted by the electronic tag 110 and the monitoring unit 130 receiving the identification communication 125 when the identification communication 125 has been relayed over the internet may be around 100 ms or more.

Hence, a time period threshold may be set which, if exceeded by an identification communication 125, indicates that it is likely that the identification communication 125 has been relayed. The time period threshold may be set according to a historical time period associated with a historical time period between the identification communication 125 being transmitted by the electronic tag 110 and the monitoring unit 130 receiving the identification communication 125 when it was known that the identification communication 125 was not being relayed.

To determine the time period, the identification communication 125 can include a time stamp indicating the time at which the identification communication 125 was transmitted by the electronic tag 120. The monitoring unit 130 can compare the time stamp with the time at which the monitoring unit 130 received the identification communication 125 in order to calculate the time period.

Figure 4:
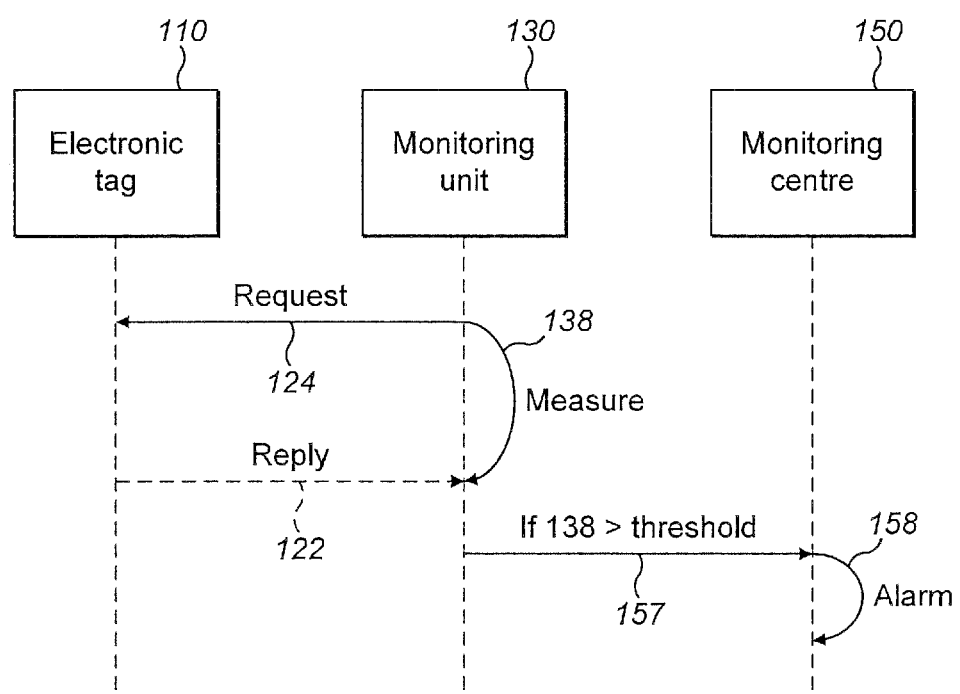
FIG. 4 illustrates a method for measuring the latency in communications between the electronic tag and the monitoring unit in order to determine whether the communications are being relayed.

FIG. 4 illustrates a method by which the monitoring unit 130 can measure the time period of communications between the electronic tag 110 and the monitoring unit 130 in order to determine whether the communications are being relayed.

The monitoring unit 130 sends a request 124 to the electronic tag 110 instructing the electronic tag 110 to send a reply 122. At the same time as sending the request 124, the monitoring unit 120 starts a timer. When the electronic tag 110 receives the request 124, the electronic tag 110 sends the reply 122. When the monitoring unit 120 receives the reply 122, the monitoring unit 130 stops the timer and records the round trip time 138 between sending the request 124 and receiving the reply 122. The round trip time 138 can then be compared against a threshold which, if exceeded, indicates that it is likely that communications are being relayed. The threshold may be set according to a historical threshold, such as a threshold set according to communication which were known not to be relayed.

Figure 5:
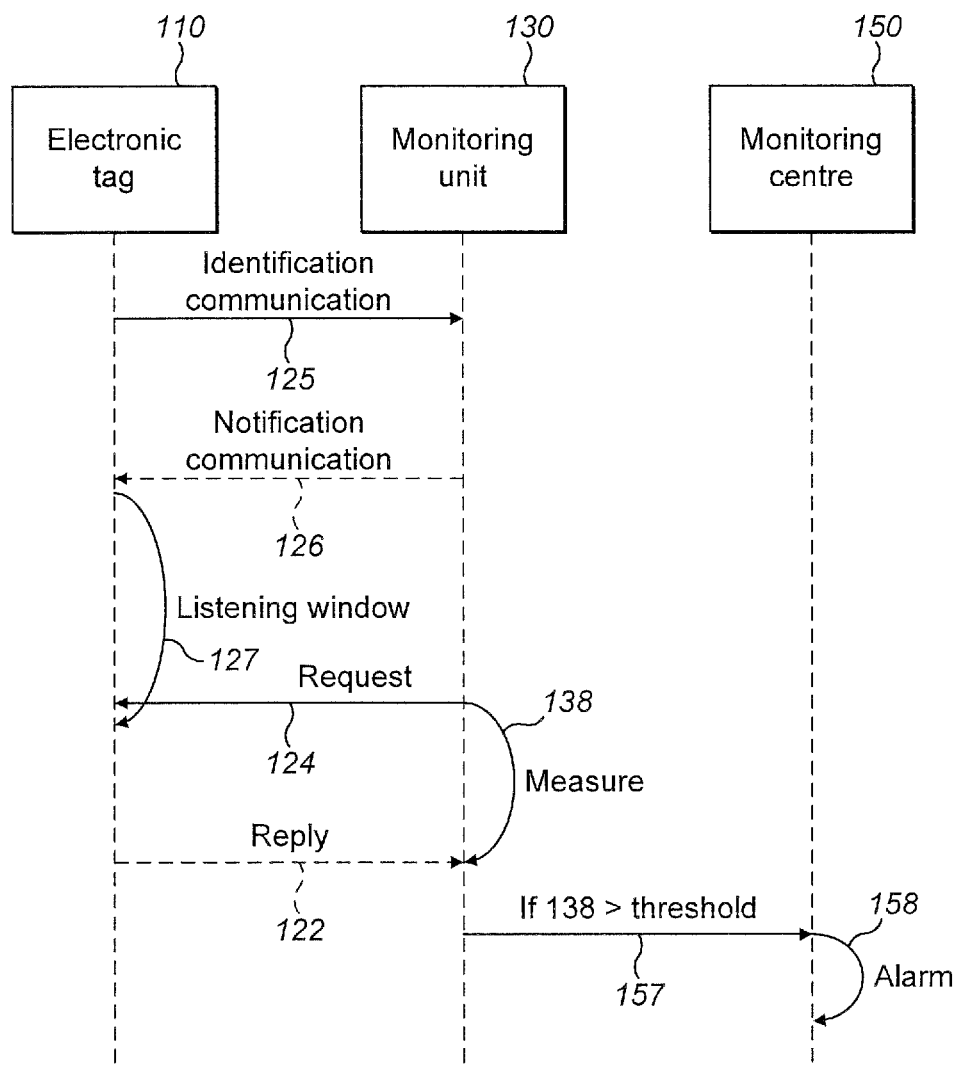
FIG. 5 illustrates some additional features which may be incorporated into the method of FIG. 4.

FIG. 5 illustrates some additional features which may be incorporated into the method of FIG. 4.

The electronic tag 110 sends an identification communication 125 which contains the code identifying the offender 110. In this example, the identification communication 125 is completely separate from communications that are used to determine whether the communications are being relayed. This allows the monitoring unit 130 to ascertain whether the electronic tag 110 is still in the vicinity of the monitoring unit 130 separately from determining whether the identification communication 125 has been relayed.

This is advantageous because ascertaining that the electronic tag 110 is still in the vicinity of the monitoring unit 130 should be done frequently to make sure that the offender 110 has not left their home 115. In contrast, determining whether the identification communication 125 has been relayed only need be performed periodically, such as when the monitoring unit 130 suspects that the identification communications 125 are being relayed, for example, when one or more other communication properties suggest that the identification communications 125 are being relayed. This helps to reduce the power consumption of the electronic tag 110 by reducing the number of requests 124 to which the electronic tag 110 must issue replies 122.

After receiving the identification communication 125, the monitoring unit 130 may issue a notification communication 126 which indicates to the electronic tag 100 that the monitoring unit 130 intends to measure the round trip time 138. So, the electronic tag 110 keeps its receiver turned on for a period of time while waiting for the notification communication 126.

If no notification communication 126 is received after the period of time has elapsed, the electronic tag 110 turns off its communications device to save power.

If a notification communication 126 is received, the electronic tag 110 switches the listening frequency of its communications device from a frequency 140 associated with the frequency of the identification communication 125 and the notification communication 126 to a frequency 142 associated with the request 124 and maintains power to the communications device throughout a listening window 127 to wait for the monitoring unit 130 to send the request 124. Providing a notification communication 126 which causes the electronic tag 110 to switch frequencies is advantageous because it allows the frequency 140 to be optimised for requirements of the identification communication 125 and the frequency 142 to be optimised for the requirements of the request 124 and reply 122.

For example, the frequency 142 could be selected to provide wide range coverage for the identification communication 125 (but in a communications band that is subject to licensing restrictions which restrict packet length) and the frequency 142 to be optimised for the request 124 and reply 122 which only require short range coverage but need a communications band that is not subject to licensing restrictions which restrict packet length.

So far, the monitoring unit 130 has been shown as calculating the time period associated with communications between the monitoring unit 130 and the electronic tag 110. Instead, the time period could be determined at the electronic tag 110.

The electronic tag 110 sends an identification communication 125 and starts a timer. The monitoring unit 130 sends a notification communication 126 in response to receiving the identification communication 125 and when the electronic tag 110 receives the notification communication 126, the electronic tag 110 stops the timer and determines the time period between the electronic tag 110 sending the identification communication 125 and receiving the notification communication 126.

The electronic tag 110 can either send the time period to the monitoring unit 130 which can use the time period to determine whether the communications were relayed. Alternatively, the electronic tag 110 can use the time period to determine whether the communications were relayed (for example, comparing the time period against a threshold in the same way as described for the monitoring unit 130). If the electronic tag 110 determined that the communications were relayed, the electronic tag 110 can send an alarm signal to the monitoring centre 150 via the monitoring unit 130.

FIGS. 6 to 9 illustrate how the variability in time intervals 146 between consecutive identification communications 125 which are received by the monitoring unit 130 can be used to ascertain whether the identification communications 125 are being relayed.

The electronic tag 110 transmits identification communications 125 at a regular time interval 146, such as once every second. Relaying the identification communications 125 can introduce variability in the time interval 146 between consecutive identification communications 125 received by the monitoring unit 130, and the level of variability can be used to determine that the identification communications 125 are being relayed.

Figure 6:
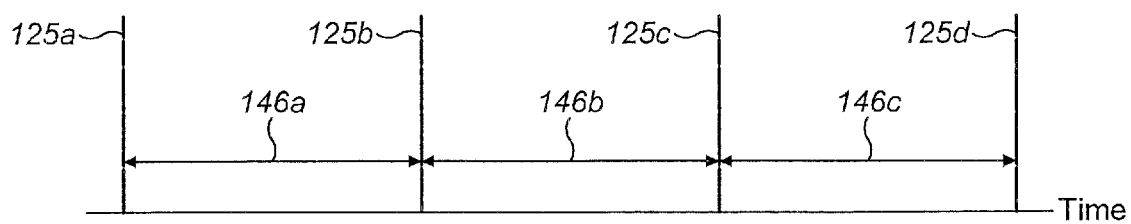
FIG. 6 illustrates the time difference between consecutive communications when the communications are received directly from the electronic tag.

FIG. 6 shows a sequence of identification communications 125a to 125d being transmitted by the electronic tag 110 with time intervals 146a to 146c between consecutive identification communications 125a to 125d that are identical. When the monitoring unit 130 receives the identification communications 125a to 125d directly from the electronic tag 110 (that is, rather than being relayed over the internet), the identical time differences 146a to 146c are preserved (as illustrated in FIGS. 6 and 7) which means that the distribution of time differences is very narrow.

Figure 7:
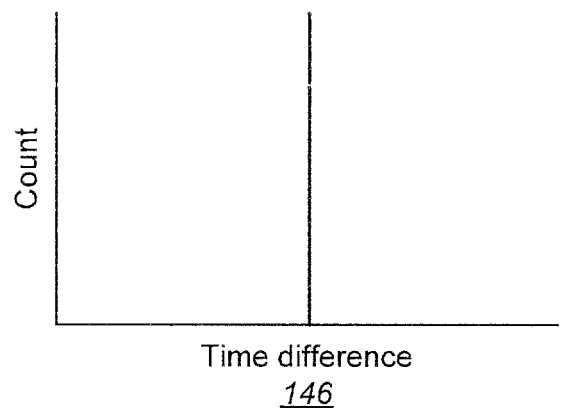
FIG. 7 illustrates the time difference distribution of FIG. 6.
Figure 8:
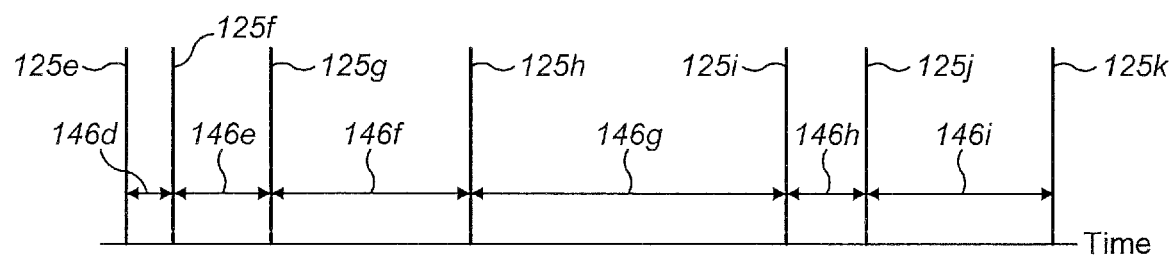
FIG. 8 illustrates the time difference between consecutive communications when the communications are being relayed.
Figure 9:
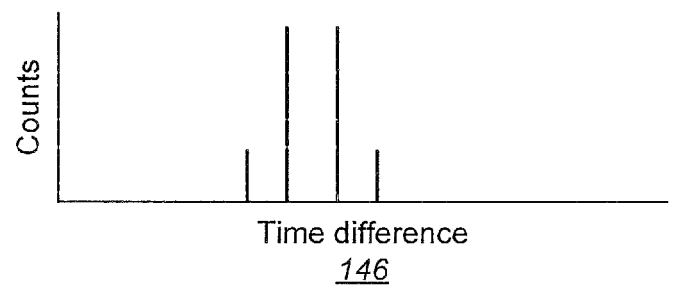
FIG. 9 illustrates the time difference distribution of FIG. 8.

FIG. 7 shows a sequence of identification communications 125e to 125k being transmitted by the electronic tag 110 where the time intervals 146d to 146i are, again, identical. However, the identification communications 125e to 125k from electronic tag 110 are then relayed over the internet 167. As a result of the variable latency that exists in communications relayed over the internet 167, there is a much broader distribution of time differences 146d to 146i between consecutive communications received by the monitoring unit 130 (as illustrated in FIGS. 8 and 9).

By analysing the variability in the time differences, for example, by applying a threshold or statistical techniques, it can be determined whether the identification communications 125 are being relayed.

Figure 10:
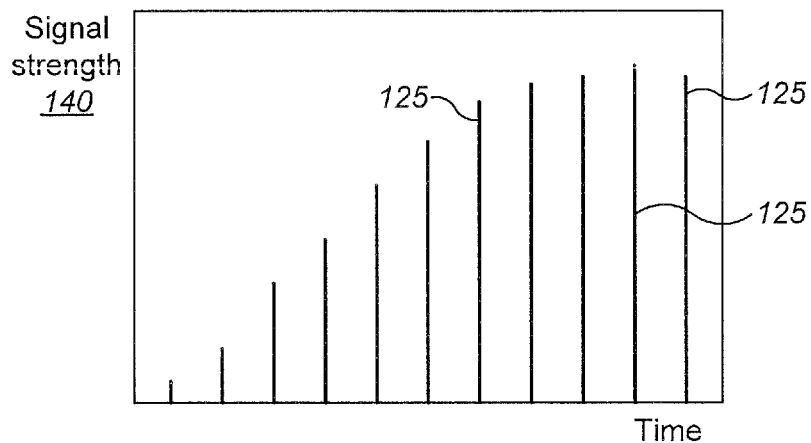
FIG. 10 illustrates the variation in signal strength of communications as a function of time for a time period shortly after communications are first received by the monitoring unit when communications are being received directly from the electronic tag.
Figure 10:
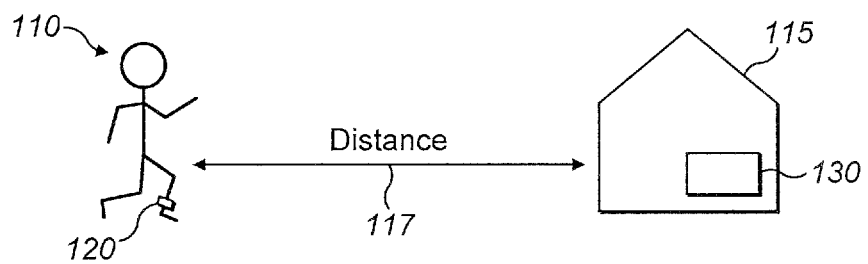
Figure 11:
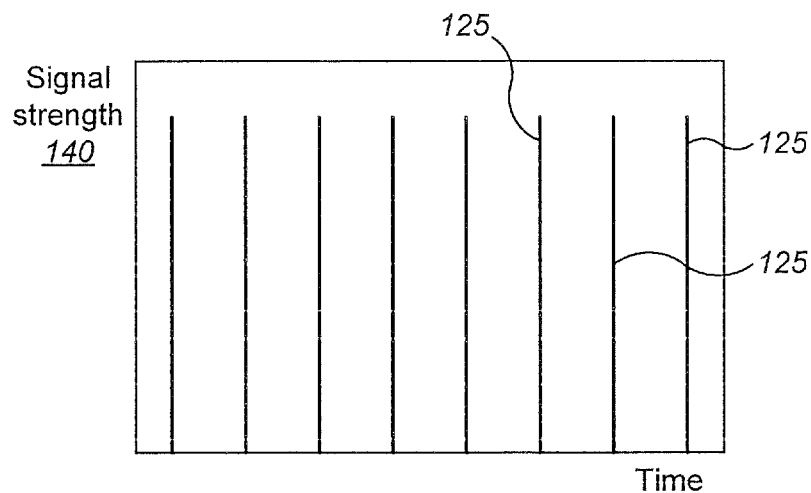
FIG. 11 illustrates the variation in signal strength of communications as a function of time for a time period shortly after communications are first received by the monitoring unit when communications are being relayed.

FIGS. 10 and 11 illustrate how signal strength 140 of the identification communications 125 over time can be used as an indication that the identification communication 125 might have been relayed.

When the identification communications 125 are not being relayed, it would be expected that the signal strength 140 of the identification communications 125 from first detection by the monitoring unit 130 would generally increase as the distance 117 between the offender 110 and the monitoring unit 130 decreases as the offender 110 travels home 115.

Similarly, when the offender 110 leaves home 115, a general decay in the signal strength 140 would be expected as the distance 117 between the offender 110 and the monitoring unit 130 increases as the offender 110 travels away from home 115.

The signal strength profile could be expected to be different whether the offender 110 walks or drives to/from home 115. However, it would not be expected that the signal strength profile 110 would suddenly switch on at maximum signal strength (as in FIG. 11) or equally suddenly switch off and such behaviour may be indicative of the identification communications 125 being relayed.

The invention claimed is:

1. An offender monitoring system comprising an electronic tag and a monitoring unit, the electronic tag comprising:
   a tether configured to secure the electronic tag to an offender; and
   a communication device configured to communicate with the monitoring unit;
the monitoring unit comprising:
   a communication device configured to communicate with the electronic tag; and
the system further comprising:
   a processor configured to analyse a communication between the electronic tag and the monitoring unit to determine a communication property and determine, based on the communication property, whether the communication between the electronic tag and the monitoring unit has been relayed via an intermediary device.

2. The offender monitoring system of claim 1, wherein determining whether the communication has been relayed comprises comparing the communication property with a historical communication property, wherein the communication is determined to have been relayed when the communication property differs from the historical communication property by more than a threshold amount.

3. The offender monitoring system of claim 1, wherein the communication property comprises one or more of: a latency associated with the communication, a one-way latency associated with the communication; and a round trip latency associated with the communication.

4. The offender monitoring system of claim 1, wherein the communication property comprises one of: a time period between the communication being sent and the communication being received; and a time period between the communication being sent and a response to the communication being received.

5. The offender monitoring system of claim 4, wherein the communication is determined to have been relayed when the time period either: exceeds a time period threshold; or exceeds a historical time period by more than a threshold amount.

6. The offender monitoring system of claim 1, wherein the electronic tag sends an identification communication which identifies an offender to whom the electronic tag is secured, and the communication property is a time period between the electronic tag sending the identification communication and the monitoring unit receiving the identification communication.

7. The offender monitoring system of claim 6, wherein the identification communication comprises a timestamp and the monitoring unit determines the time period using the timestamp.

8. The offender monitoring system of claim 6, wherein the monitoring unit sends a notification communication in response to receiving the identification communication.

9. The offender monitoring system of claim 8, wherein the communication property comprises a time period between the identification communication being sent by the electronic tag and the notification being received by the electronic tag.

10. The offender monitoring system of claim 1, wherein the monitoring unit sends a request communication and the electronic tag sends a reply in response to the request communication, wherein the communication property is a time period between the request being sent by the monitoring unit and the reply being received by the monitoring unit.

11. The offender monitoring system of claim 10, wherein the monitoring unit sends a notification communication before the request communication.

12. The offender monitoring system of claim 11, wherein the notification communication prevents the electronic tag from powering down a receiver in the electronic tag for either: a period of time or until the request communication is received.

13. The offender monitoring system of claim 11, wherein the notification communication is configured to switch the communications device in the electronic tag from a frequency associated with the notification communication and a frequency associated with the request communication.

14. The offender monitoring system of claim 11, wherein the electronic tag sends an identification communication which identifies an offender to whom the electronic tag is secured and the monitoring unit sends the notification communication in response to receiving the identification communication.

15. The monitoring system of claim 1, wherein a plurality of communications are sent and the communication property is determined for one or more selected communications of the plurality of communications.

16. The offender monitoring system of claim 1, wherein the processor is configured to analyse a plurality of communications between the electronic tag and the monitoring unit and the communication property comprises a variability of the latency associated with the plurality of communications.

17. The offender monitoring system of claim 1, wherein the processor is configured to analyse a plurality of communications between the electronic tag and the monitoring unit and the communication property comprises a signal strength profile associated with the plurality of communications.

18. The offender monitoring system of claim 17, wherein the plurality of communications has been relayed when the signal strength does not generally increase after a first communication is received and/or does not generally decrease prior to a final communication being received.

19. The offender monitoring system of claim 1, wherein the processor is configured to send an alarm communication to a monitoring centre over a communication link when it is determined that the communication is being relayed.

20. The offender monitoring system of claim 1, wherein the intermediary device comprises a first device configured to receive the communication and transmit the communication over a communication link to a second device configured to transmit the communication.

* * * * *